Feb. 28, 1967　　　　C. W. HENDERSON　　　　3,306,554
DISTRIBUTOR MECHANISM
Filed July 15, 1964　　　　　　　　　　　　　　13 Sheets-Sheet 3
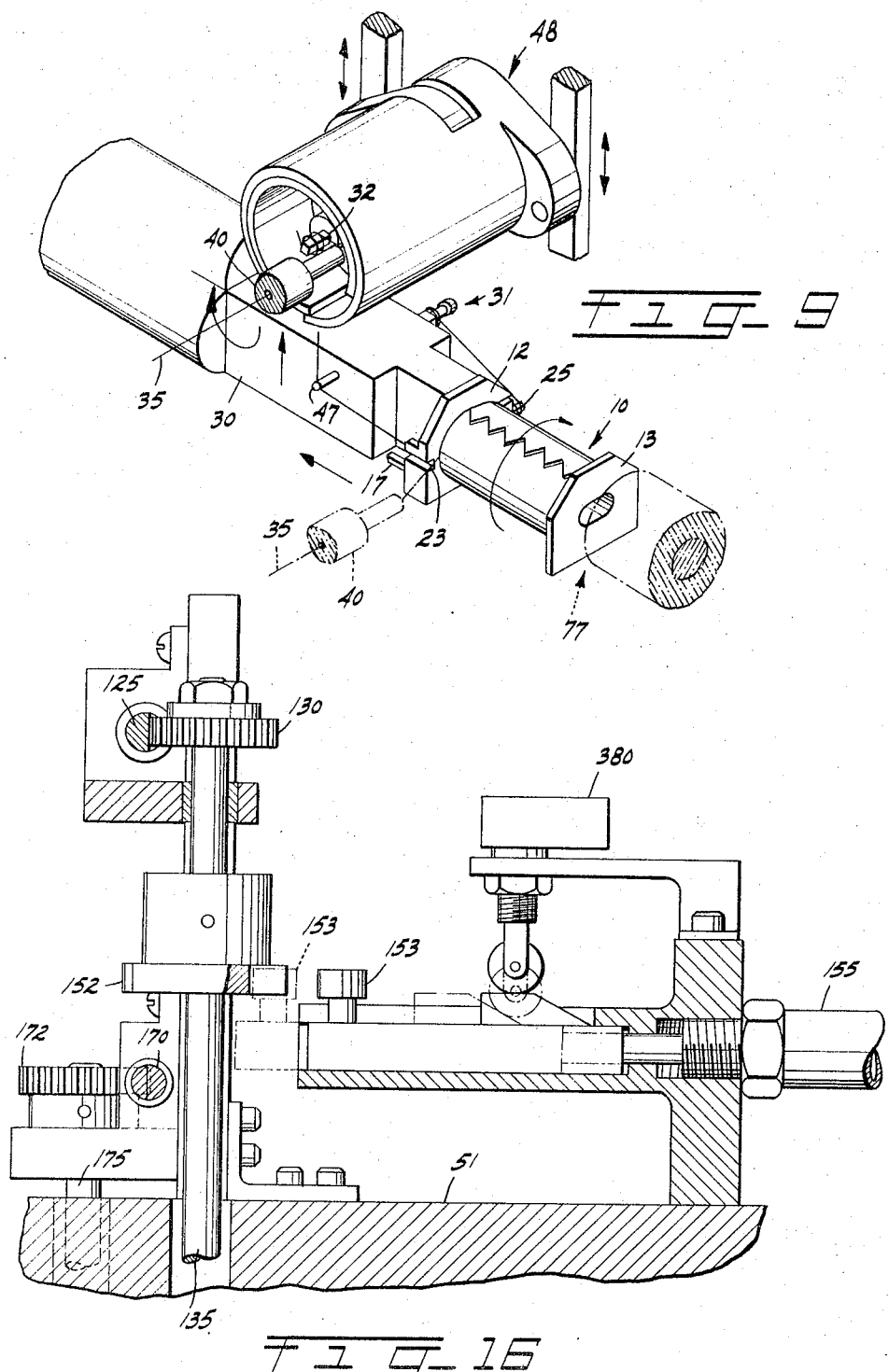

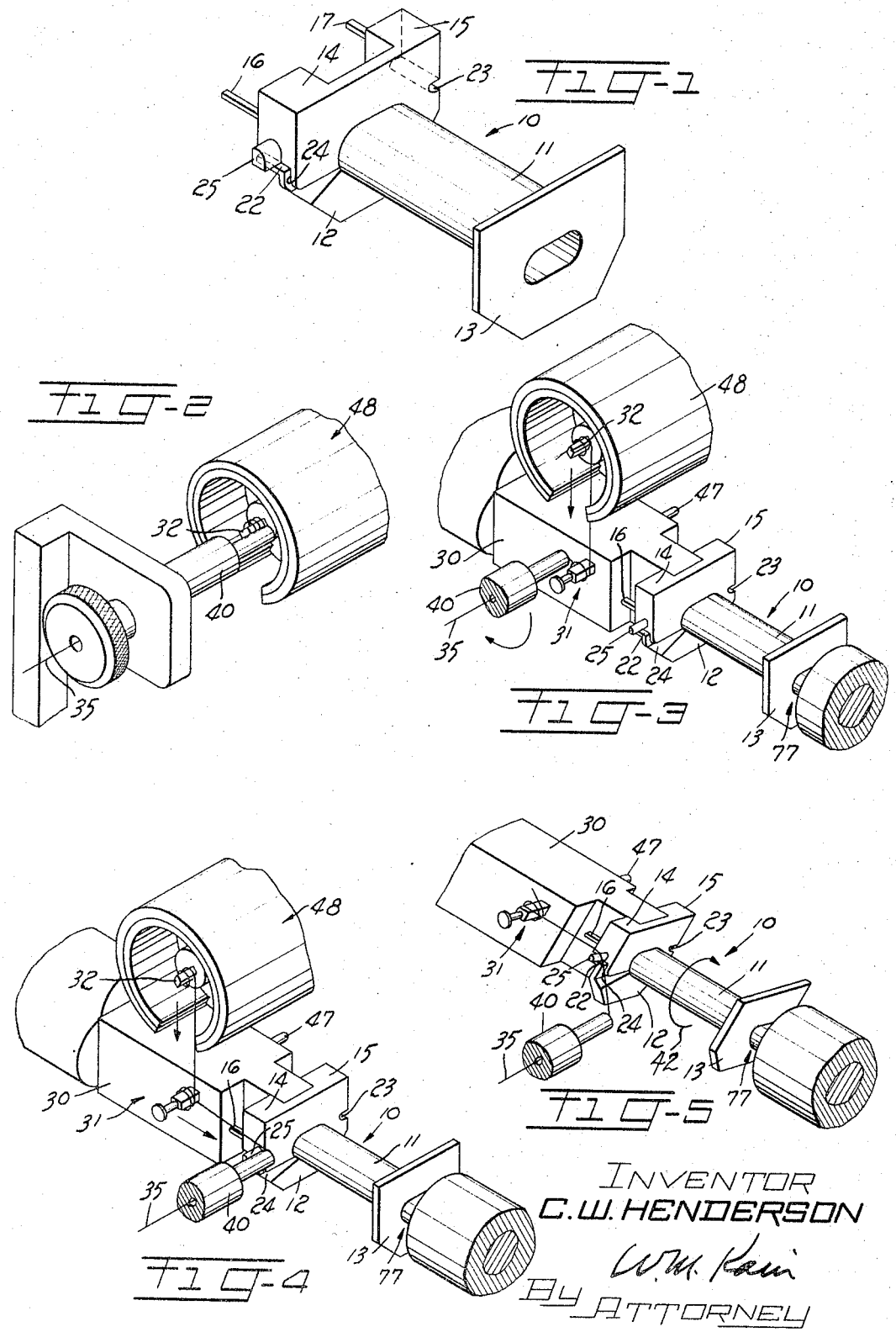

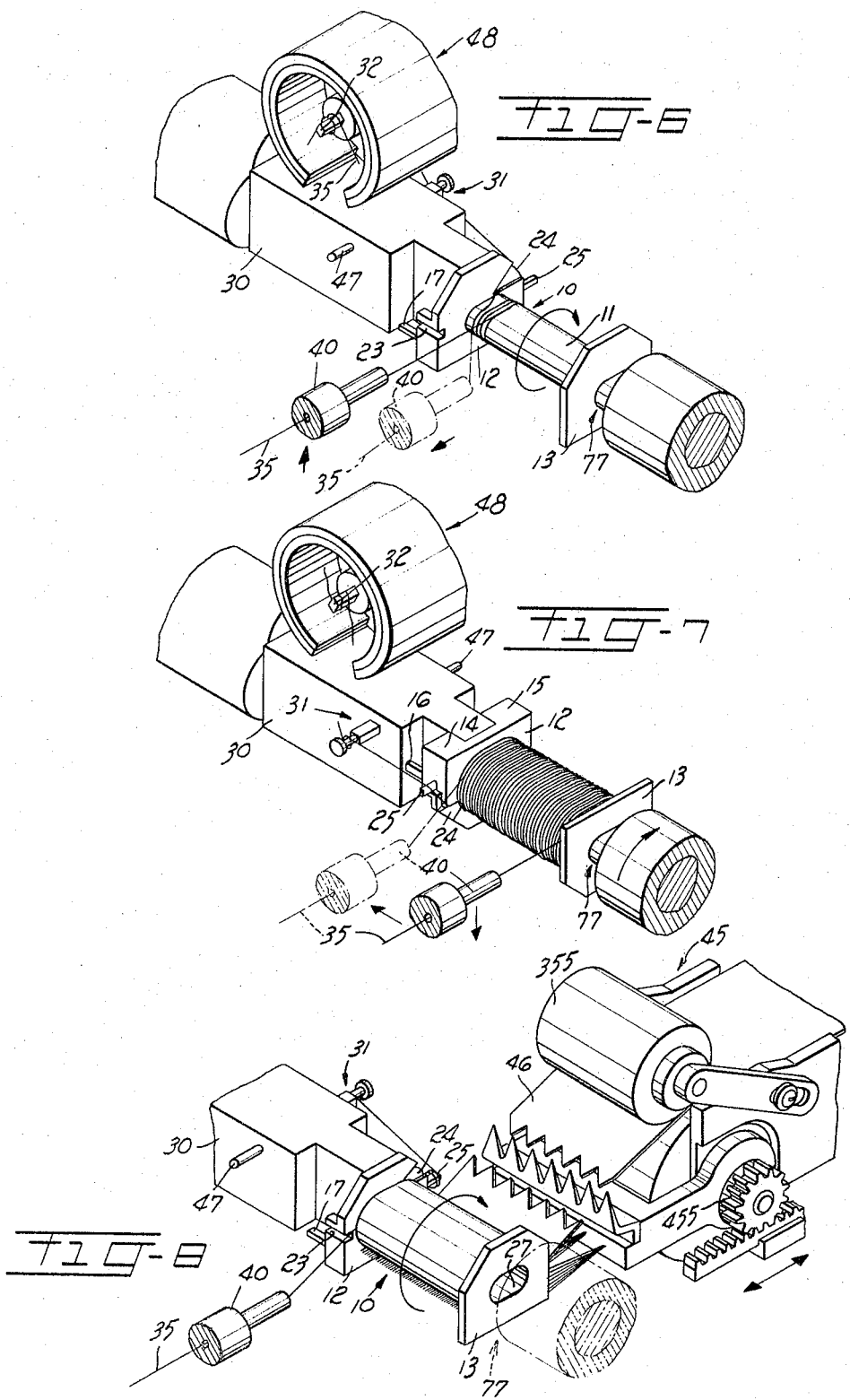

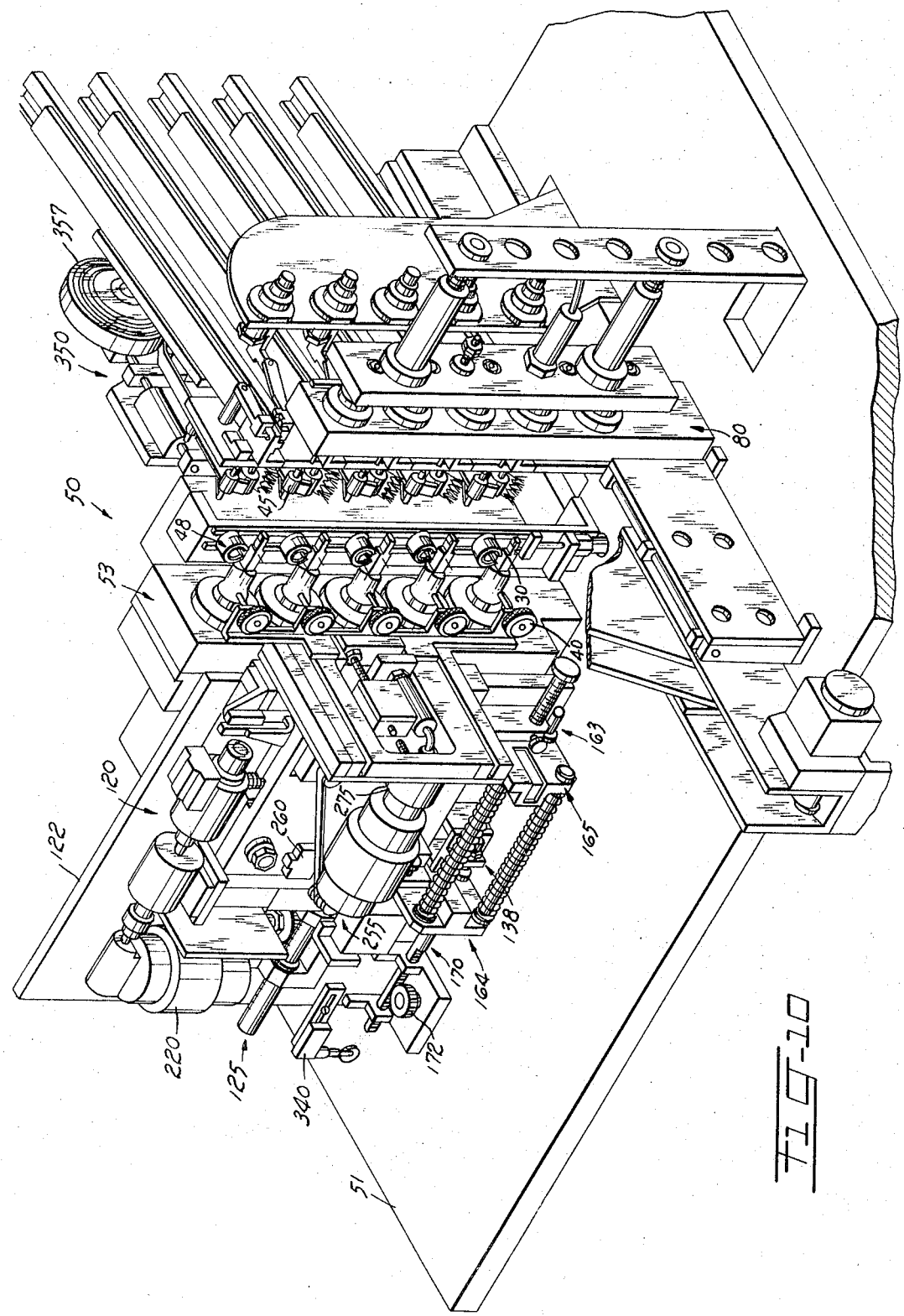

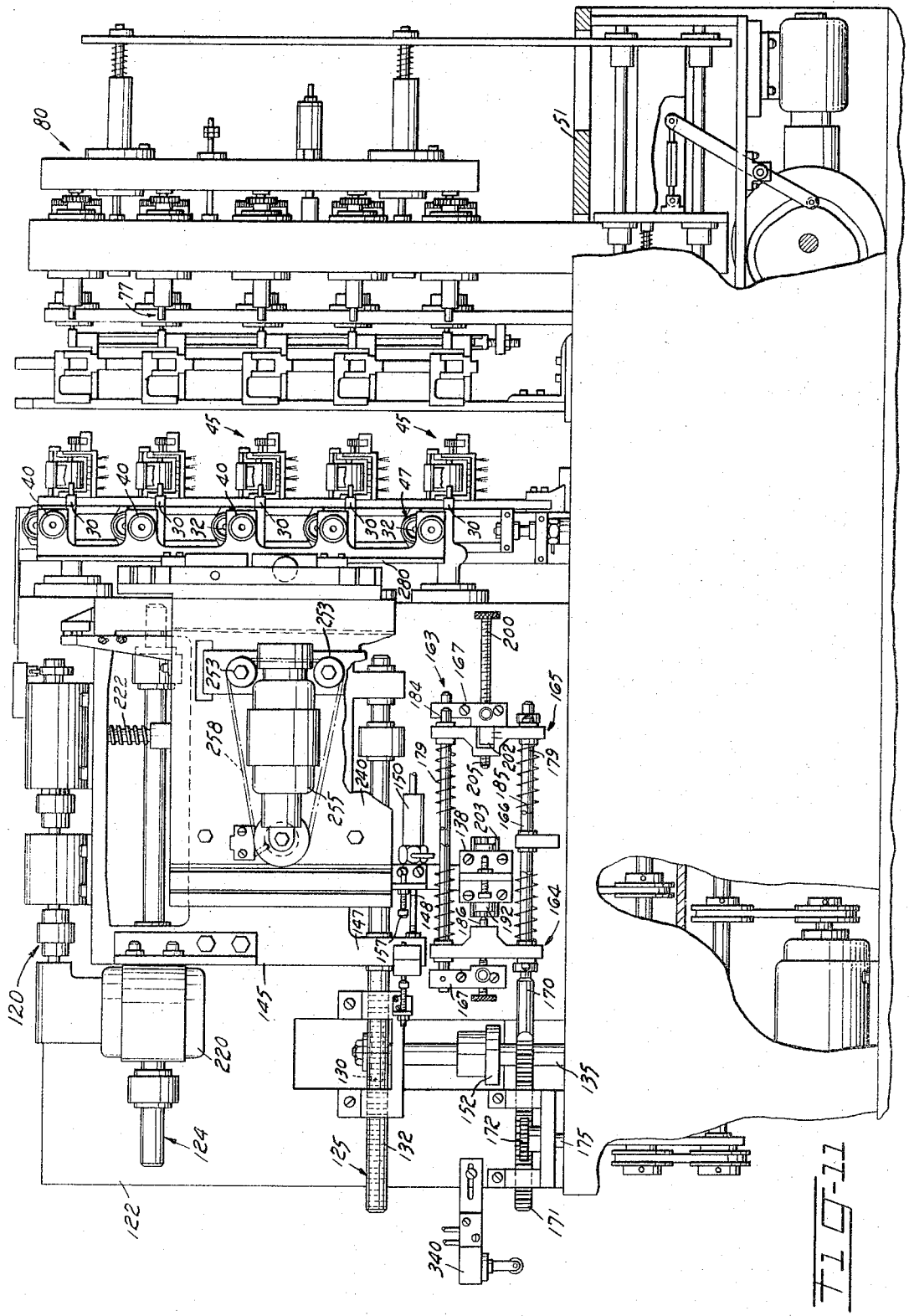

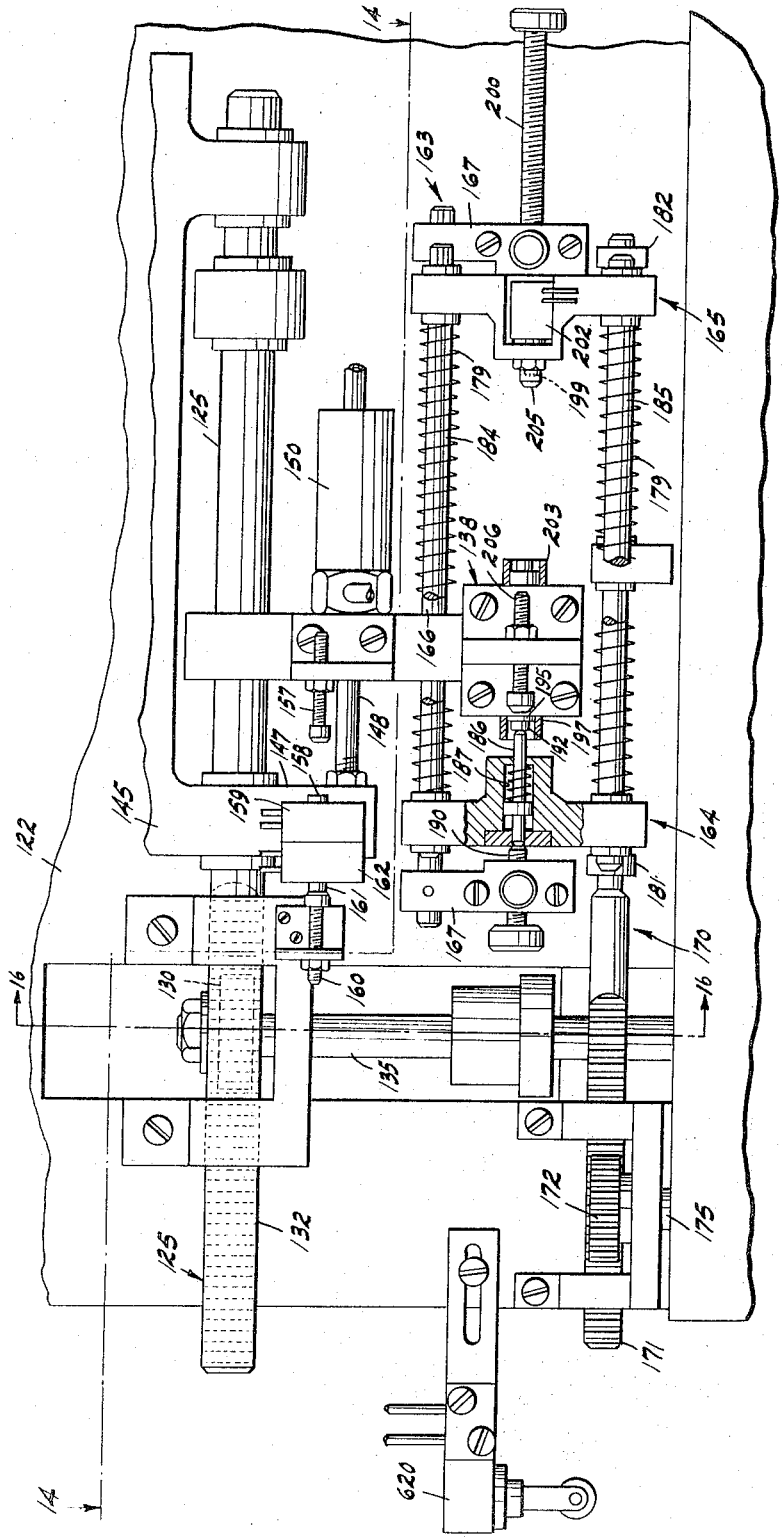

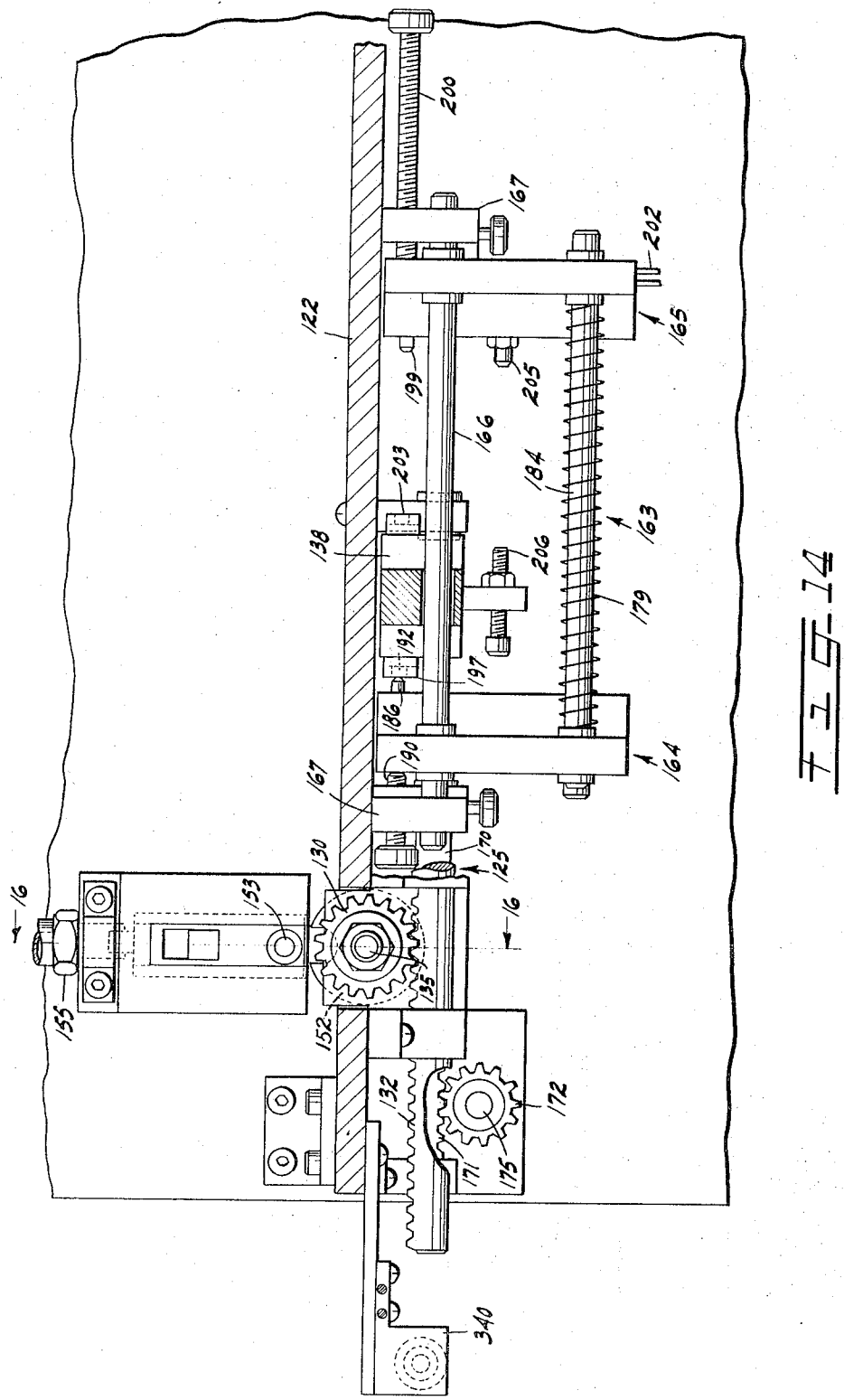

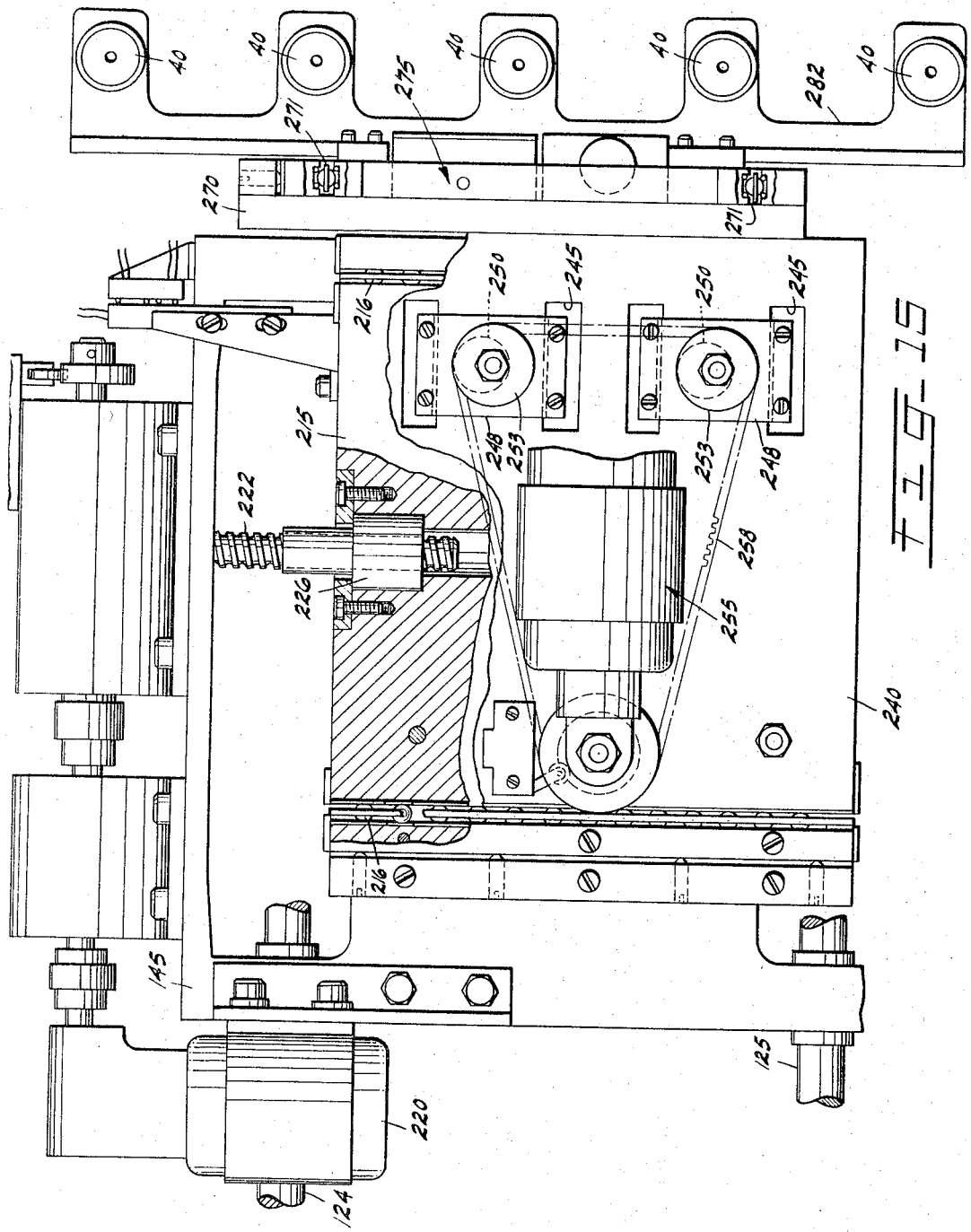

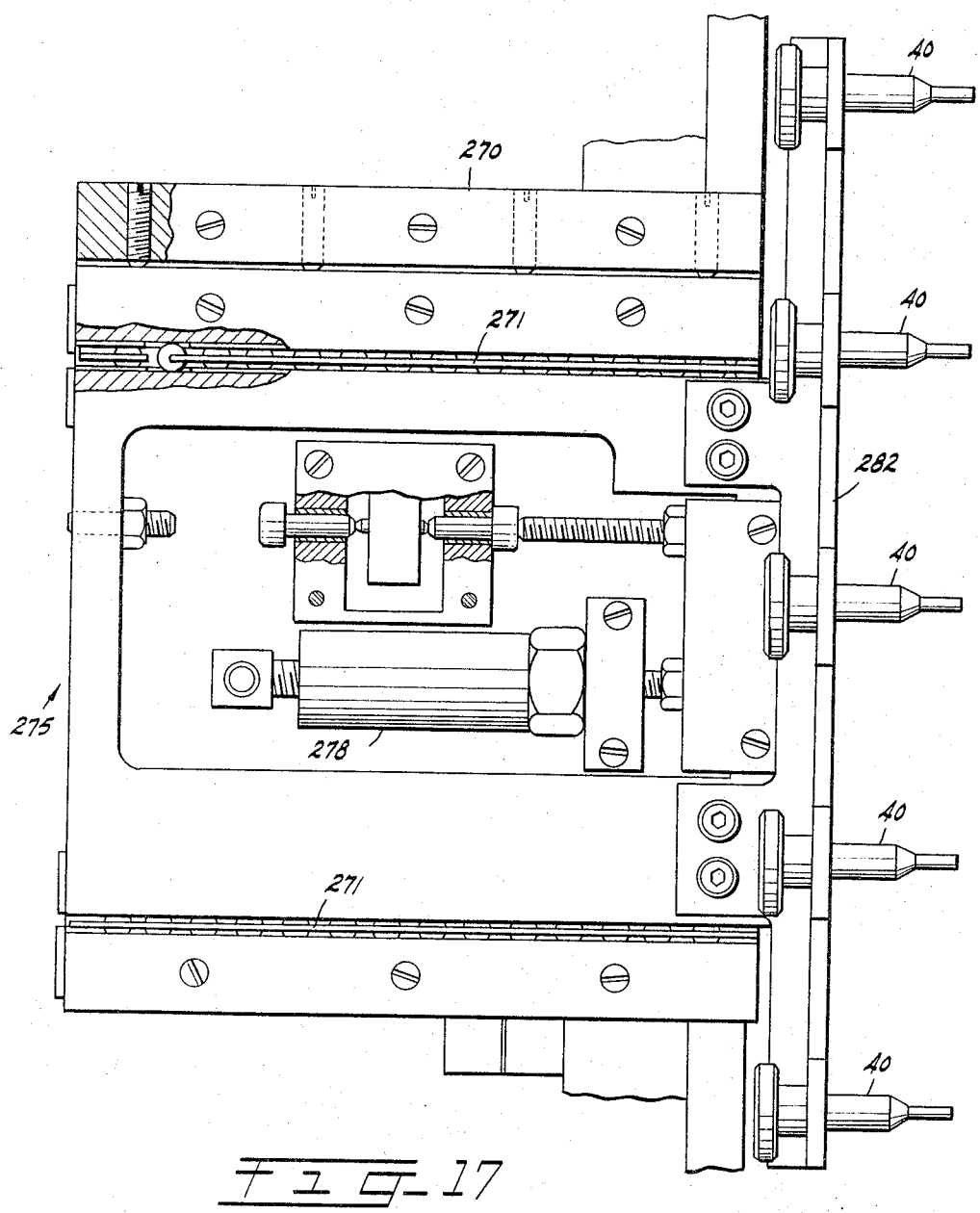

Feb. 28, 1967  C. W. HENDERSON  3,306,554
DISTRIBUTOR MECHANISM
Filed July 15, 1964  13 Sheets-Sheet 11
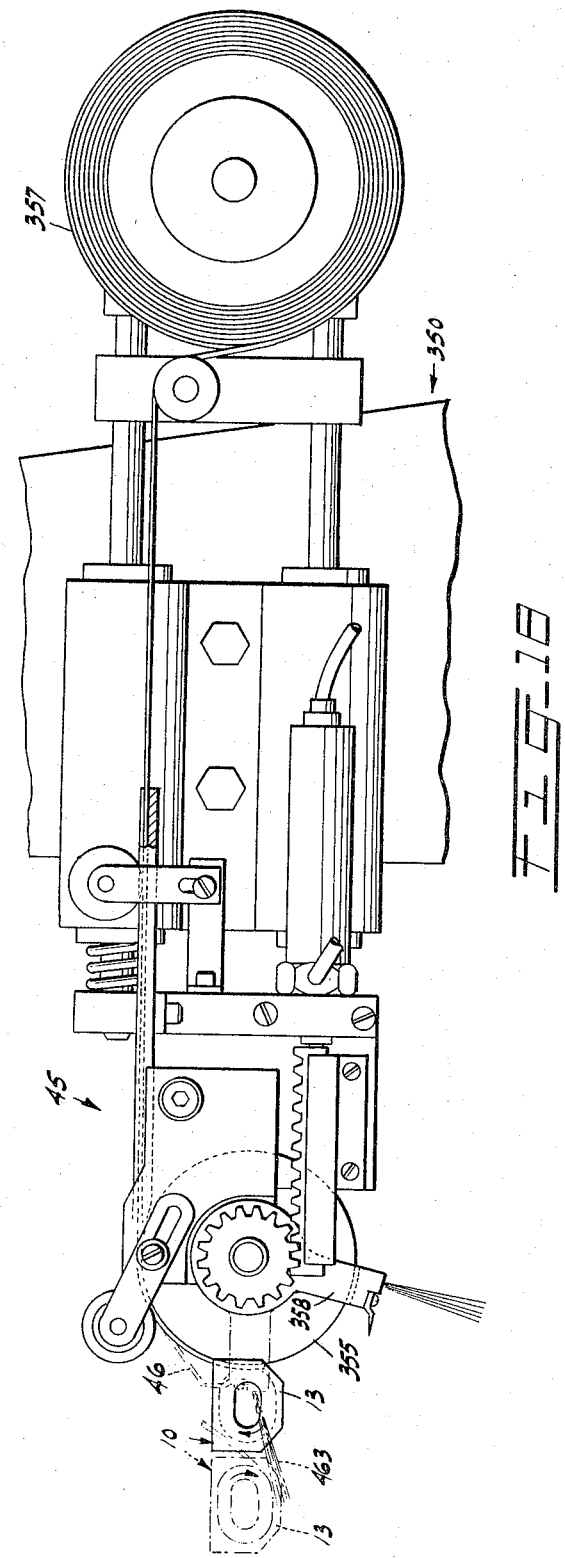

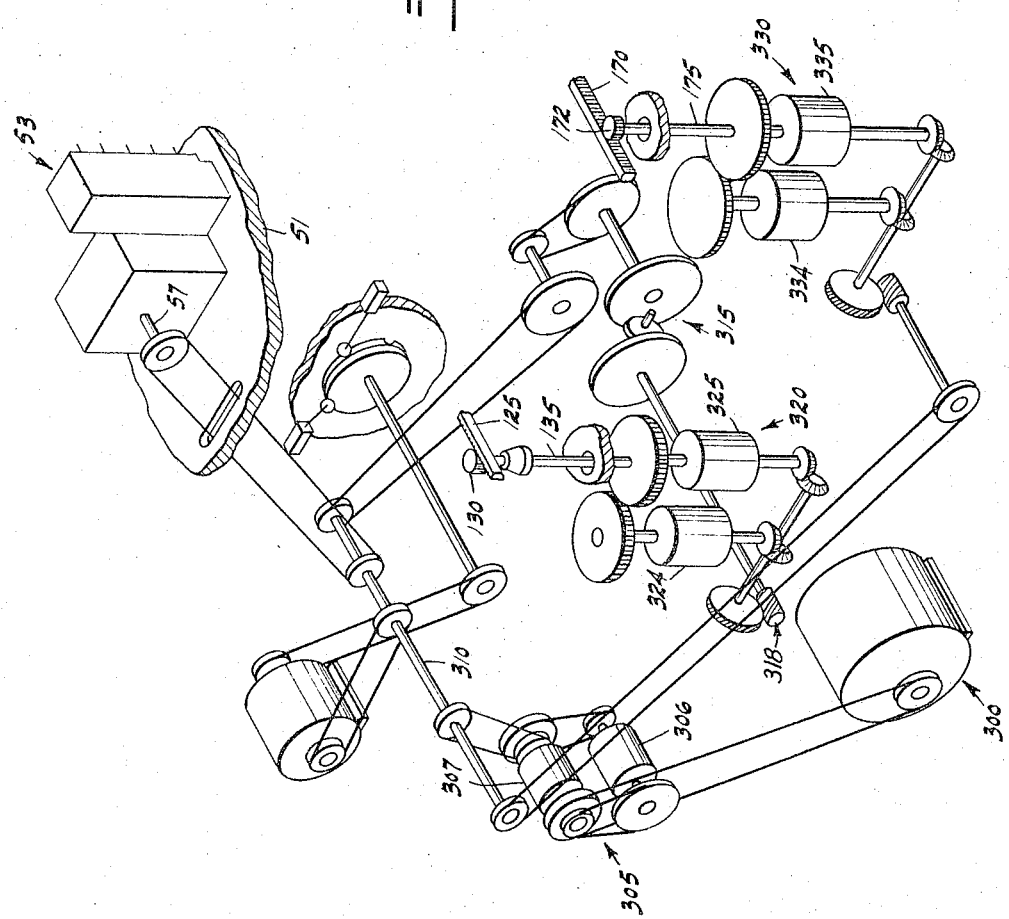

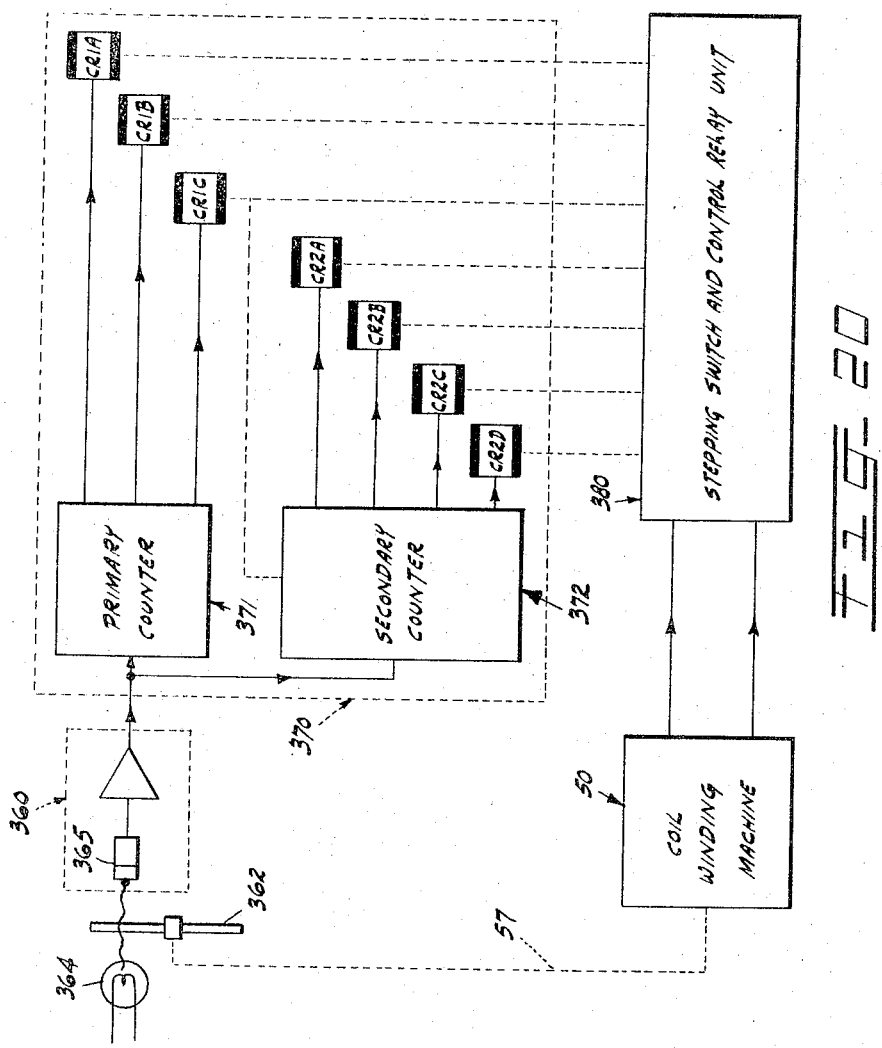

United States Patent Office 3,306,554
Patented Feb. 28, 1967

3,306,554
DISTRIBUTOR MECHANISM
Clifford W. Henderson, Princeton Township, Mercer County, N.J., assignor to Western Electric Company, Incorporated, New York, N.Y., a corporation of New York
Filed July 15, 1964, Ser. No. 382,808
7 Claims. (Cl. 242—158)

This invention relates to apparatus for winding strand material. More particularly, the invention relates to apparatus for distributing strand material across the winding surface of a rotating bobbin or the like during a winding operation.

It is often desirable in a winding operation, such as one in which electrical coils are wound, to place a predetermined number of turns on a winding form, for example, a bobbin. Through the use of suitable turn counters and related controls, it is possible to determine very accurately the exact number of turns placed upon a bobbin. As the turns of wire are wound upon the bobbin, it is usual to provide a distributor mechanism which may, for example, employ a reciprocating guide arranged to move to and fro adjacent to the bobbin at a predetermined rate proportional to the rotational speed of bobbin rotating means. In this manner, a predetermined number of uniformly and closely packed turns of wire can be formed on the bobbin in superimposed layers extending between opposite ends of the bobbin.

Although it is not too difficult to control the exact number of turns placed on the bobbin by using conventional turn-counting facilities, it is another and a very difficult problem to insure that the last turn of a desired number of turns is placed on a bobbin at a definite position, for example, immediately adjacent to one of the flanges of a flanged bobbin. The latter may be a necessary requirement to facilitate the lead-out of the terminal end of the wire from an electrical coil wound on a flanged bobbin. This problem is complicated by the fact that winding machines, in order to have reasonable utility, must be versatile enough to accommodate the winding of a variety of coils having different turn counts on the same machine without costly machine changes and down time. Generally, there can be no assurance that exactly the same spacial relationships can be maintained during successive winding operations on substantially identical coils and, thus, no assurance that the last turn placed on a bobbin will be in the same position between the ends of the flanges of the bobbin as the last turn placed on a prior bobbin wound in the same manner and on the same machine.

The above-mentioned problem seriously complicates the manufacture of electrical coils. It is often undesirable that the last turn of the winding be positioned at a point intermediate the flanges, because of the vulnerability to breakage of the lead-out span of wire extending from such intermediate point to a flange. Because the flange usually has a larger radial dimension than the wound coil, a span of wire extending from an intermediately positioned turn is likely to be unsupported at its center and the likelihood of breakage, particularly when a conventional wrapping of insulating tape is placed on the electrical coil, is very great. It should be apparent that apparatus capable of insuring that the last turn of a desired number of turns is placed immediately adjacent to the flange, would represent an important advance in the coil winding art by providing a solution to a vexing problem.

It is an object of this invention to provide new and improved apparatus for winding strand material.

Another object of this invention is to provide new and improved apparatus for distributing strand material on a rotating bobbin.

A further object of the invention is to provide new and improved appartaus for distributing a desired number of turns of a relatively fragile wire upon a bobbin in the manufacture of electrical coils and for insuring that the last turn is placed at a predetermined position on the bobbin.

Apparatus illustrating certain features of the invention may include guide means movable with respect to the winding surface of a winding form, such as a bobbin or the like, to direct the strand material onto the winding surface. Drive means normally connected to the guide means is designed to move the guide means to distribute the convolutions of the strand material across the winding surfaces. Traverse means is provided and is movable along the path of travel of the guide means. The traverse means is normally inoperative and disconnected from the guide means. Means are provided for operating the traverse means to cause the latter to move along the path of travel of the guide means, and to overtake the guide means somewhere on its path of travel. When the moving traverse means overtakes the guide means, means are actuated for causing the traverse means to thereafter control the further movement of the guide means and, thus, the direction of the strand material onto the winding surface. In one embodiment of the invention, the traverse means assumes control of the guide means to insure that as the last turn of the desired number of turns is placed on the winding form, the turn is located at a predetermined position.

A complete description of the invention may be had from the following detailed description of apparatus forming an exemplary embodiment thereof, when read in the light of the accompanying drawings, in which:

FIG. 1 is an enlarged, perspective view of a bobbin of an exemplary type which may be employed as a winding form for an electrical coil having a desired number of turns;

FIGS. 2–9, inclusive, illustrate pictorially various successive stages of an exemplary coil winding operation;

FIG. 10 is a perspective view of an automatic coil winding machine;

FIG. 11 is a front elevational view, partially broken away, of the coil winding machine shown in FIG. 10;

FIG. 13 is an enlarged view, partially broken away, of a portion of a wire guide assembly forming part of the coil winding machine, as viewed in FIG. 11;

FIG. 14 is a horizontal section taken along lines 14—14 of FIG. 13;

FIG. 15 is an enlarged view of still another portion of the wire guide assembly, as viewed in FIG. 11, with parts broken away;

FIG. 16 is an enlarged, vertical section taken along lines 16—16 of FIG. 13;

FIG. 17 is an enlarged, side elevational view, partially broken away, of a radial carriage and attached wire guide tubes forming a part of the wire guide assembly;

FIG. 18 is an enlarged, side elevational view of a taping unit forming part of a taping assembly associated with the coil winding machine illustrated in FIG. 10;

FIG. 19 is a schematic diagram of a drive system and related electromechanical controls for the coil winding machine; and FIG. 20 is a block diagram and schematic representation of a programmed electrical control circuit for controlling the operation of the coil winding machine.

Figure 12:
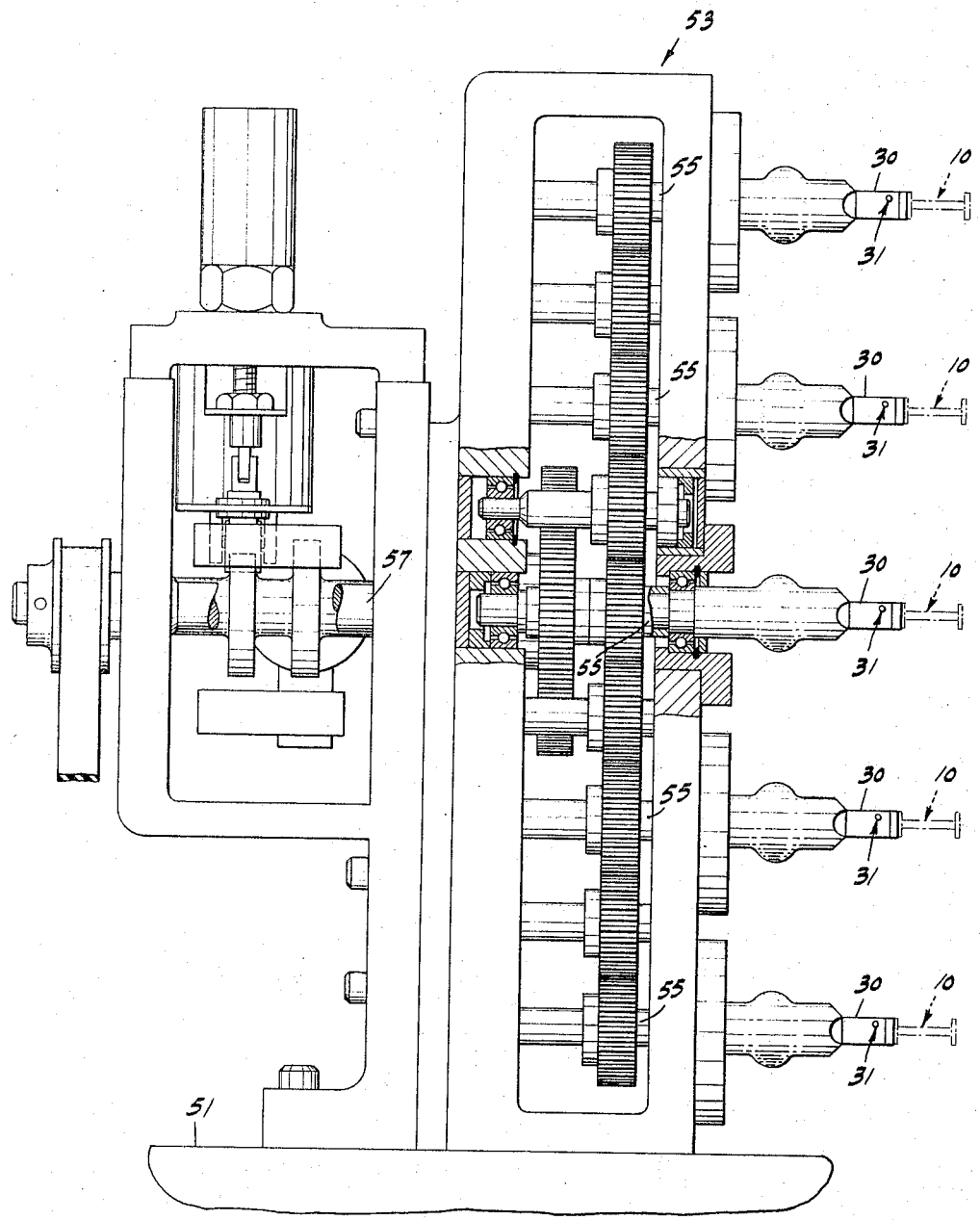
FIG. 12 is an enlarged, vertical section, partially broken away, of a spindle head assembly forming part of the coil winding machine.

Referring now to FIG. 1, there is shown a molded, plastic bobbin 10 which is designed to serve as a winding form and support for an electrical coil, for example, the armature coil of a relay. The bobbin 10 includes a drum 11 extending between left and right flanges 12 and 13, respectively. The outer face of the left flange 12 is provided with two, integrally molded plastic bosses 14 and 15 in which are secured metal terminals 16 and 17, respectively. The bosses 14 and 15 are provided with molded lead-in and lead-out grooves 22 and 23, respectively, formed in the outer peripheries of the respective bosses and extending substantially parallel to the respective terminals 16 and 17.

During a winding operation, a desired number of turns of a relatively fragile, insulated wire are wound into a coil, comprising a plurality of superimposed layers of uniformly packed convolutions, on the drum 11 of the bobbin 10 and lead-in and lead-out portions of the wound coil extend from the first and last turns, respectively, through the lead-in and lead-out grooves 22 and 23, respectively, to be attached to the respective metal terminals 16 and 17.

To facilitate the positioning and engagement of the lead-in portion of the wire onto the bobbin 10 at the beginning of a winding operation, the flange 12 is provided with a slot 24 which is open at the peripheral edge of the flange and at its inner face, the last-mentioned opening extending from the outer periphery of the flange to the winding surface of the drum 11. It may be seen that the groove 22 communicates with the slot 24 to facilitate a final positioning of the lead-in portion of the insulated wire. The groove 23 extends across the peripheral edge of the flange 12 to the inner face thereof to receive the lead-out portion of the wire extending from the last turn of the wound coil. As mentioned previously, it is highly desirable and important that the last turn of a desired number of turns be placed immediately adjacent to the flange 12 to facilitate the positioning of the lead-out portion and to obviate the likelihood of damage to the fragile wire.

A lug 25, which is molded integrally with the flange 12 and the boss 14, projects outwardly from the boss at a point immediately above and to one side of the opening of the slot 24 in the peripheral edge of the flange. As will become more apparent from the following description, the lug 25 functions as a camming member to facilitate the placement of the lead-in portion of the insulated wire in the slot 24 at the beginning of a winding operation.

As shown in FIG. 3 the bobbin 10 is removably mounted on a rotatably driven arbor 30. The arbor 30 is provided with a laterally projecting arbor pin 31 which, at the start of a coil winding cycle, is positioned directly below a stationary anchor pin 32. At this time the axes of the arbor pin 31 and anchor pin 32 are horizontal, substantially parallel and lie in a common vertical plane.

A supply of insulated wire 35, for example, fine copper wire having a thin, impervious coating of an insulating enamel, is arranged to be fed through a hollow, needle-like, wire guide tube 40. At the termination of an immediately preceding coil winding cycle, a portion of the wire 35 was wrapped in a plurality of turns tightly about the anchor pin 32 so that the leading end of the wire, which is subsequently to be drawn through the wire guide tube 40 during the present coil winding cycle, is anchored securely to the anchor pin. As the cycle commences, the wire guide tube 40 is moved vertically downwardly to a position immediately adjacent to the arbor pin 31. As the wire guide tube 40 moves, the wire 35 is drawn therethrough from the wire supply. As shown best in FIG. 3, the longitudinal axis of the wire guide tube 40 is parallel to the axis of the anchor pin 32 and, in moving downwardly to a position immediately adjacent to the arbor pin 31, moves in a vertical plane spaced a short distance from the aforementioned common vertical plane including the axes of the arbor pin and the anchor pin.

When the wire guide tube 40 is positioned immediately adjacent to the arbor pin 31, it is caused to make two complete revolutions about the axis of the temporary storage pin to form two turns of the wire 35 about the arbor pin (see FIG. 3). The wire guide tube 40 is next caused to move horizontally to the right, as viewed in FIG. 4, toward the flange 12 of the bobbin 10. This movement of the wire guide tube 40 carries a span of wire from the arbor pin 31 across the top surface of the lug 25 on the bobbin 10. This latter movement is stopped with the axis of the wire guide tube 40 positioned slightly above and substantially in alignment with the slot 24 in the flange 12. Next, the wire guide tube 40 is caused to move downwardly below the bobbin axis and the arbor 30 is then rotated slowly in the direction shown by the arrow 42 in FIG. 5, causing the wire 35 to be cammed into the slot 24 in the flange, the wire being guided by the walls of the slot into position on the winding surface of the drum 11 and against the inside face of the flange 12.

As the arbor 30 begins to rotate (FIG. 5), the span of wire 35 extending between the arbor pin 31 and the anchor pin 32 breaks, because of the tension placed on the relatively fragile wire. Thus, the lead-in portion of a coil, which is subsequently to be wound about the drum 11, is formed.

The low-speed rotation of the arbor and bobbin continues until three turns of wire are placed on the drum 11. As these turns are placed on the drum 11 of the bobbin, the wire guide tube 40 is reciprocated horizontally at a speed synchronized with the speed of the rotating bobbin to distribute the wire evenly so as to achieve uniform and closely wound turns. The wire guide tube 40 is then retracted a short distance in a horizontal direction outwardly from the winding surface of the drum 11 and moved vertically upwardly to a horizontal winding plane, as shown in solid outlines in FIG. 6. Concurrently, the arbor 30 and bobbin 10 are accelerated to a relatively high-winding speed, e.g., 10,000 r.p.m. The horizontal, reciprocating movement of the wire guide tube 40 continues in synchronism with the rotational speed of the bobbin to continue the winding of uniform, closely wound, helical turns of wire on the drum. The horizontal wire-distributing movement of the wire guide tube 40 is alternately reversed as the wire reaches the extremities of the drum 11 adjacent to the inside surfaces of the flanges 12 and 13 so that as the winding proceeds a plurality of uniformly wound, superimposed layers are formed.

The high-speed winding operation continues until a major portion of the desired number of turns (e.g., 6800 turns) of wire have been wound upon the drum 11 of the bobbin 10. When a point is reached in the operation, whereat only a first predetermined number of turns (e.g., 200 turns) still remain to be wound, the rotation of the bobbin drops to a lower speed, for example, approximately 2000 r.p.m., and winding at this lower speed continues until only a second predetermined number of turns (e.g., 30 turns) remain to be wound, whereupon the bobbin speed drops again to a still lower speed (e.g., 150 r.p.m.). At this point the wire guide tube 40 moves vertically downwardly to the plane of the lead-out groove 23 in preparation for the forming of the lead-out portion of the coil and the operation of the wire guide tube 40 is controlled in accordance with the present invention so as to insure that, as the last few turns of the desired number of turns are placed on the drum 11, the wire guide is positioned immediately adjacent to the inside of the flange 12. Thus, the last convolution of the predetermined number of turns constituting the finished coil is positioned immediately adjacent to the flange 12 and is not haphazardly located.

The wire guide tube 40 is temporarily locked in the last-mentioned position and a taping unit 45 is operated to apply a strip of pressure-sensitive insulating tape 46 (FIG. 8) over the outer layer of turns on the drum 11 as the bobbin continues to rotate. During the taping operation one or more remaining turns of the desired number of turns of wire may be applied and upon completion of the desired number of turns of wire, rotation of the bobbin 10 is stopped and the bobbin is temporarily locked in an angular position (FIG. 9), which oriented 180° from the position shown in FIG. 3, so that the groove 23 and the wire guide tube 40 are in registry. The wire guide tube 40 is then driven a short distance in toward the bobbin and horizontally to the left, passing under a guide pin 47 on the arbor. and is thereafter moved upwardly until it is adjacent to the anchor pin 32. The wire guide tube 40 is then revolved about the axis of the anchor pin 32 to wrap the wire thereabout preparatory to the next winding cycle. The span of wire extending between the guide pin 47 and the anchor pin 32 is then severed by a cutter 48 to form the lead-out portion of the wound coil.

*Coil winding machine*

Shown in FIGS. 10 through 13 is a coil winding machine 50 which embodies in an exemplary form certain features of the invention. A complete and more detailed description of the overall coil winding machine is disclosed in a copending application of J. S. Cartwright, C. W. Henderson, G. E. Melvin, R. C. Steen, and E. S. Tice, Serial No. 377,857, filed June 25, 1964, which is entitled "Methods of and Apparatus for Winding Wire," and is assigned to the assignee of the present application. For the purposes of the present description, many details of the machine disclosed in the copending application, but which are not essential to an understanding of the present invention, have been eliminated or treated in general terms.

The winding machine 50 includes a base plate 51 supported by a suitable pedestal structure. Mounted fixedly on the base plate 51 is a spindle head assembly 53 including five rotatably driven spindles 55 (FIG. 12) mounted in a parallel, vertically spaced array. The spindles 55—55 are driven by a common spindle drive shaft 57 which rotates all five of the spindles simultaneously in the same direction and at the same speed.

Secured to each of the spindles 55—55 is an arbor 30 having an axially projecting, stepped end having a configuration complementary to that of the left-hand end of a bobbin 10 which is engaged thereon in driving relationship. The right-hand end of each of the bobbins 10—10 is supported by a corresponding one of five freewheeling live centers 77—77 (FIG. 11). The live centers are carried by a tail stock assembly 80 and are cooperatively associated and aligned with a corresponding one of the arbors 30—30. Facilities are provided for moving the tail stock assembly relative to the arbors 30—30 to accomplish the loading and unloading of the bobbins 10—10 automatically.

A wire guide assembly, indicated generally by the numeral 120 (FIGS. 10 and 11), is mounted adjacent to the spindle head assembly 53 and is designed to control the positioning of wire guide tubes 40—40 during a coil winding cycle. The wire guide assembly 120 is supported from a vertical support plate 122. Attached to the vertical support plate 122 is a horizontal guide rod 124 (FIG. 11) arranged in parallel, vertically spaced relationship with respect to a fine traverse or distributor drive rod 125. The latter functions as a guide in addition to its primary function which is that of a motivating means for a horizontal carriage 145.

To facilitate horizontal reciprocation of the distributor drive rod 125, the latter is journaled on suitable antifriction bearings. A cutout formed in the support plate 122 provides clearance for a spur gear 130 which meshes with teeth of a rack section 132 formed integrally on the left-hand end of the distributor drive rod 125 (as viewed in FIG. 13). The spur gear 130 is mounted on the upper end of a distributor drive shaft 135 which extends vertically through an opening provided in the base plate 51.

A carriage driver 138 is pinned to the distributor drive rod 125 for horizontal movement in unison therewith. As best shown in FIG. 13, the carriage driver has a generally inverted T-shaped configuration and comprises an elongated shank depending from the drive rod and an enlarged, generally rectangular-shaped head formed integrally with the lower end of the shank. The carriage driver 138, as its name implies, is designed to drive the horizontal carriage 145 normally in accordance with the reciprocating movement of the distributor drive rod 125 as will become apparent as the specification proceeds.

The horizontal carriage 145 is a plate-like member which is journaled slidably on both the guide rod 124 and the drive rod 125. A depending gear 147 on the horizontal carriage 145 is connected to the left-hand end (as viewed in FIG. 13) of a piston rod 148 of a double-acting air cylinder 150 which is mounted on and secured to the shank of the carriage driver 138. The piston rod 148 extends freely through an aperture formed through the shank of the carriage driver 138.

The air cylinder 150 (FIGS. 11 and 13) provides a means for obtaining precise indexing movement of the wire guide tubes 40—40 for accurately moving the same between the anchor pin plane and a vertical plane containing the vertically aligned slots 24—24 in the bobbins 10—10 mounted on their respective arbors 30—30. Facilities are provided for locking the distributor drive rod 125 in a predetermined horizontal position. As illustrated in FIGS. 14 and 16, these facilities include a notched locking cam 152 secured on the distributor drive shaft 135. The locking arm 152 cooperates with a detent 153 operated by a double-acting air cylinder 155. When the detent 153 is engaged with the locking cam 152, the drive shaft 135 is locked to accurately position the wire guide tubes 40—40. Specifically, when the detent 153 is thus engaged and the piston rod 148 (FIG. 13) is fully retracted, the guide tubes 40—40 are positioned in a common vertical plane substantially aligned with the slots 24—24 of the bobbins 10—10. Subsequent energization of the air cylinder 150 to extend the piston rod 148 will cause the wire guide tubes to be indexed to the left into the anchor pin plane.

Mounted on the shank of the carriage driver 138 is an adjustable striker 157 aligned axially with a spring-biased actuator 158 of a microswitch 159 mounted on the front of the horizontal carriage 154 (see FIG. 13). When the piston rod 148 is fully retracted, the striker 157 is in pressing engagement with the actuator 158 and the microswitch 159 is closed. Another adjustable striker 160 is mounted on the support plate 122 for cooperation with a spring-biased actuator 161 of a microswitch 162. When the piston rod 148 is fully extended, the microswitch 162 is closed.

A rapid traverse mechanism 163 (FIGS. 13 and 14) is mounted to the support plate 122 beneath the horizontal carriage 145 for cooperation with the carriage driver 138. The rapid traverse mechanism 163 includes a pair of movable, rapid traverse carriages 164 and 165 which are essentially mirror images of one another. The rapid traverse carriages 164 and 165 are mounted slidably on a horizontal guide rod 166 supported at its opposite ends by spaced bracket members 167—167 fixed to the vertical support plate 122. The rapid traverse carriages 164 and 165 are also slidably mounted on a rapid traverse drive rod 170. The left-hand end of the drive rod 170 is provided with a toothed rack section 171 which meshes with a spur gear 172 mounted on the upper end of a rapid traverse drive shaft 175 extending vertically through an opening provided in the base plate 51. Rotation of the drive shaft 175 is converted into horizontal movement of the drive rod 170.

A collar 181 fixed to the drive rod 170 is designed to cooperate with the left-hand face of the carriage 164 during rightward movement of the drive rod to transport the carriage 164 to the right. Similarly, another collar 182 fixed to the drive rod 170 cooperates with the right-hand face of the carriage 165 during leftward movement of the drive rod. The carriages 164 and 165 are normally urged apart by compression springs 179—179 mounted on stabilizing rods 184 and 185. The stabilizing rod 184 is fixed to the carriage 164 and slidably received in the carriage 165. Conversely, the stabilizing rod 185 is fixed to the carriage 165 and slidably received in the other.

As shown in FIG. 13, the carriage 164 is provided with a slidable, spring-biased plunger 186 mounted in a counterbored seat 187. The compression springs 179—179 normally urge the carriage 164 to the left and against the end of a limit adjustment stop 190 threadedly recived within the bracket member 167. The position of the stop 190 may be adjusted axially to establish the limits of the leftward travel of the carriage 164, as will become more apparent from the following description.

It may be seen from FIG. 13 that, when the carriage 164 is in abutting contact with the end of the stop 190, the right-hand end of the spring-biased plunger 186 protrudes axially from the right-hand face of the carriage 164 and in this position is capable of striking the left-hand end of a horizontally shiftable actuator 192 which operates a SPDT two-way reversing switch 195 mounted within the head of the carriage driver 138. When the plunger 186 strikes the actuator 192, the reversing switch 195 is thrown to reverse the direction of travel of the carriage driver 138, as will become more apparent as the specification proceeds.

It will also be seen that, when the carriage 164 is moved rightwardly so that the plunger 186 is no longer in engagement with the limit adjustment stop 190, the plunger is fully retracted within its counterbored seat 187 and cannot engage the actuator 192 and that, instead, the right-hand face of the carriage 164, upon relative movement toward the carriage driver 138, will strike the end face of a sleeve-like metal housing 197 which projects from the head of the carriage driver and surrounds and extends beyond the end of the actuator 192. Thus, with the plunger 186 retracted, the carriage 164 can push against the carriage driver 138 without operating the reversing switch 195. It will be understood, however, that, if the plunger 186 is extended, the actuator 192 will be struck and the reversing switch 195 will be thrown before the right-hand face of the carriage 164 can contact the end of the housing 197.

Similarly, the carriage 165 is provided with a plunger 199 identical in construction and operation to the plunger 186. A limit adjustment stop 200 is provided on the bracket member 167 for accurately adjusting and setting the rightward limits of travel of the carriage driver 138 through cooperation between the plunger 199 and the opposite end of the spring-biased actuator 192. A housing 203 surrounds the opposite end of the actuator 192 and is similar in construction and purpose to the housing 197.

The carriage 165 also carries an override microswitch 202 which has a spring-biased actuator 205 projecting leftward from the left-hand face of the carriage. The actuator 205 is aligned for cooperation with an adjustable striker 206 supported in a projecting ear attached to the carriage driver 138. The override microswitch 202 is normally closed and when the actuator 205 is contacted by the striker 206, the microswitch is opened to disengage the distributor drive shaft 135 from its associated drive, in a manner hereinafter to be described.

A vertical positioning carriage 215 (hereinafter referred to as "the vertical carriage") is mounted slidably on the front face of the horizontal carriage 145 between spaced, parallel, vertical ball-bearing guides 216—216 which form a vertical slideway, as viewed in FIG. 15. A motor 220 mounted on the vertical carriage 215 is arranged to actuate the vertical carriage through a drive including a lead screw 222 which engages a ball nut 226 secured to the vertical carriage. The motor 220 is controlled by an electrical control circuit which is appropriately programmed to impart predetermined vertical movements to the vertical carriage 215 and, thus, the wire guide tubes 40—40, as required during a coil winding cycle.

Superimposed on the vertical carriage 215 is a wrapping carriage 240 (FIG. 15) which is arranged for revolving (orbital) movement relative to the vertical carriage 215. The wrapping carriage 240 is in the form of a flat, plate-like member provided with a pair of circular apertures designed to receive circular, disc-like eccentric cams formed on a pair of stub shafts 250—250, each of which is in turn journaled at a first end in the vertical carriage 215 and at a second end in a corresponding mount 248. Each of the mounts 248—248 is supported by the vertical carriage 215. Timing belt pulleys 253—253 are keyed to the second ends of the stub shafts 250—250 and a timing belt 258 entrained thereabout drives the stub shafts from an electric wrapping motor 255 which is also mounted on the vertical carriage through an oversized opening formed in the wrapping carriage. As the stub shafts 250—250 are driven by the wrapping motor 255, the wrapping carriage 240, by virtue of the eccentricity of the cams on the stub shafts 250—250 and freedom of the wrapping carriage to move relative to the vertical carriage, is caused to revolve in a fixed attitude to impart orbital movement to the wire guide tubes 40—40. The wrapping motor 255 is controlled by the programmed electrical control circuit to impart orbital movements to the wire guide tubes 40—40 at predetermined times as required for wrapping during a coil winding cycle.

As shown in FIG. 15, the right-hand end of the wrapping carriage 240 projects a short distance beyond the vertical carriage 215 and the horizontal carriage 145, and carries a support plate 270 which is positioned in a vertical plane perpendicular to the main support plate 122. Attached to the support plate 270 are horizontally extending, parallel, ball-bearing guides 271—271 which constitute a slideway in which a radial carriage 275 (FIG. 17) is mounted slidably for radial movement toward and away from the bobbin axes. The radial carriage 275 is operated by a double-acting air cylinder 278 which is secured to the support plate 270.

A mounting frame 282, which carries the five vertically aligned wire guide tubes 40—40, is attached to the radial carriage 275 for movement therewith. The wire guide tubes 40—40 are each provided with a needle-nosed end portion having a restricted passageway through which a wire is advanced from a corresponding one of five individual wire supply spools (not shown).

It may be seen from the foregoing description that the wire guide assembly 120 is composed of (1) the horizontal carriage 145 which facilitates horizontal traversing movements of the wire guide tubes for wire distribution on the bobbins and horizontal indexing movements of the wire guide tubes relative to their respective arbors, bobbins and anchor pins; (2) the vertical carriage 215 which facilitates the vertical positioning of the wire guide tubes; (3) the wrapping carriage 240 which facilitates orbital movements of the wire guide tubes as required for wrapping the wires about the anchor pins and arbor pins; and (4) the radial carriage 275 which facilitates radial, in-and-out movement of the wire guide tubes.

With respect to the important problem of properly distributing a desired predetermined number of turns of wire on the individual bobbins 10—10, the horizontal carriage 145 and its associated motivating means are of prime importance. During a major portion of a coil winding cycle from the winding of the first turn until the coil is almost completely wound, the movement of the horizontal carriage 145 is controlled by the distributor drive rod 125 which is reciprocated by the distributor drive shaft 135. Normally, while the horizontal carriage 145 is being driven by the distributor drive shaft, the rapid traverse drive shaft is inoperative.

Referring now to FIG. 19, there is shown schematically a machine drive system which includes a main drive motor 300 which is energized during the entire cycle of operation. The output shaft of the main drive motor 300 is connected, through a mechanical speed change unit 305 (two speeds, high and low), comprising a combination of electrically operated friction clutches 306 and 307 and interconnecting timing belt drives, to a main drive shaft 310. Another timing belt drive connects the main drive shaft 310 to the spindle drive shaft 57 which, in turn, drives the spindles 55—55 (FIG. 12). The main drive shaft 310 is also connected, through another timing belt drive, a variable speed, winding pitch adjusting unit 315, a worm and worm gear unit 318 and a drive reversing mechanism 320, to the distributor drive shaft 135.

The drive reversing mechanism 320 comprises a pair of parallel drive shafts driven through two bevel gears and two alternately energizable, electrically operated, friction clutches 324 and 325 and a pair of meshing spur gears. Oscillatory movement of the distributor drive shaft 135 is effected by alternately energizing one and then the other of the friction clutches 324 and 325. Energization of the clutches 324 and 325 is determined by the condition of the reversing switch 195 carried by the carriage driver 138 (see FIG. 13).

Referring to FIG. 13 again, it will be understood that when the actuator 192 of the reversing switch 195 is struck by the plunger 186, the reversing switch is thrown to a condition such that normally the clutch 325 is deenergized and the clutch 324 is energized. With the clutch 324 energized, the distributor drive shaft 135 is driven in a direction such as to move the distributor drive rod 125 and, thus, the horizontal carriage 145 from left to right. At the other extreme of travel of the horizontal carriage 145, the other end of the actuator 192 normally strikes the plunger 199 and the reversing switch 195 is thrown into its other condition wherein the clutch 324 is deenergized and the clutch 325 is energized, whereupon the travel of the distributor drive rod is again reversed and the horizontal carriage 145 moves from right to left. In this manner, the desired to-and-fro distributing movement is imparted to the wire guide tubes 40—40 to guide the wire onto each of the bobbins 10—10 in uniform superimposed layers between the flanges 11 and 12.

Returning now to FIG. 19, the rapid traverse drive shaft 175, which is inoperative during the first and major portion of the coil winding cycle, is connected to the main drive shaft 310 through a timing belt drive and a drive reversing mechanism 330 which is similar to the drive reversing mechanism 320. The drive reversing mechanism 330 includes two electrically operated friction clutches 334 and 335 which are normally deenergized and inoperative. When the rapid traverse drive shaft 175 is driven, its direction of rotation and, thus, the direction of horizontal movement of the rapid traverse drive rod 170, depends on which one of the friction clutches 334 or 335 is energized at the time. In the operation of the preferred embodiment herein described, only the clutch 335 is utilized to drive the rapid traverse drive rod 170 from the right to the left, as viewed in FIG. 13, because, in the winding operation chosen to illustrate the invention, it is desired that the last turn of the coil be placed against the left flange 12 of the bobbin 10.

When the clutch 335 is energized, the rapid traverse drive rod 170 is immediately put in motion toward the left as viewed in FIG. 13 at a speed, which in this particular embodiment is somewhat greater than the speed of the fine traverse drive rod. It will be understood, however, that if desired, the speed of the rapid traverse drive rod could be the same or less than that of the fine traverse drive rod.

When the rapid traverse drive rod 170 is placed in motion upon energization of the clutch 335, it immediately begins to move the rapid traverse carriage 165 from right to left, as viewed in FIG. 13. While the rapid traverse carriage 165 is moving to the left, the distributor drive rod 125 continues to control the movement of the horizontal carriage 145 until the rapid traverse carriage 165 overtakes the carriage driver 138 and the override microswitch 202 is hit and operated by the striker 206. At this point the override microswitch, which has been arranged in series with an energizing circuit for the clutches 324 and 325, breaks the circuit to deenergize whichever one of the clutches was energized. Thereupon, the distributor drive shaft 135 becomes free-wheeling and the movement of the horizontal carriage 145 is thereafter under the exclusive control of the rapid traverse drive rod 170 which continues to move the horizontal carriage 145 to the left until a limit microswitch 340 is actuated to deenergize the clutch 335. At this time, the horizontal carriage 145 has been moved to the left, and with the piston rod 148 of the cylinder 150 retracted, is located at the predetermined position with the wire guide tubes 40—40 positioned to place the wire against the flanges 12—12 of the bobbins 10—10. Simultaneously, the detent 153 is operated to lock up the distributor drive rod 125. Concurrently with the deenergization of the clutch 335 and the operation of the detent 153, the rapid traverse drive rod 170 becomes free-wheeling and is returned by the springs 179—179 to its starting position, at the extreme right as viewed in FIG. 13, preparatory to the next cycle.

It will be understood that the drive ratio between the main drive motor 300 and the rapid traverse drive rod 170 is by design selected and set so that during the time interval in which the rapid traverse carriage 165 moves from its starting position to the predetermined position wherein the wire guide tubes 40—40 are directing the wire against the flanges 12—12 of the bobbins 10—10, a predetermined number of turns (e.g., 25 turns) are placed on each of the rotating bobbins 10—10. It should now be apparent that, if the clutch 335 controlling the leftward movement of the rapid traverse carriage 165 is energized precisely at the point in time when only 25 turns remain to be wound on each of the bobbins 10—10, the last turn will be placed against the flange 12, on each of the bobbins, the rotation of the bobbins then being stopped immediately.

In practice, however, it may be desirable, as in the present example, to energize the clutch 335 at a time when slightly more than 25 turns remain to be wound, for example, 30 turns, and in this case the last six (6) turns will be wound immediately adjacent to the flanges 12—12. The latter arrangement permits a wrapping of the insulating tape 46 to be applied and wiped onto the body of the wound coil while slowly rotating the bobbins and while the last few turns of the desired number of turns of wire are placed on the bobbins.

In the exemplary embodiment herein described, the taping operation is performed with taping units 45—45 forming a part of a taping assembly 350 (FIG. 18) which operates in synchronism with the winding operation and is described in detail in the aforementioned copending application, Serial No. 377,857. The taping assembly 350 is mounted for movement transverse to the axes of the bobbins and is cam-operated under the control of the programmed electrical control circuit.

Each of the taping units 45—45 includes a rubber-surfaced, tape-applicator roller 355 over which the leading end of a pressure-sensitive insulating tape 46 extends from a supply roll 357. The adhesive-coated side of the insulating tape is up, so that the uncoated side is in contact with the surface of the roller 355. When the taping assembly 350 is activated, each of the rollers 355 moves in to press its respective tape 46 against the body of the coil formed on the respective bobbin, whereupon continued rotation of the bobbin wraps a length of the tape thereabout. Cutting and wiping means 358 are provided for severing the tape and wiping the severed end.

As previously mentioned, a programmed electrical control circuit (FIG. 20) is provided to control the operation of the winding machine. This circuit is described in great detail in the aforementioned copending application Serial No. 377,857. The circuit includes a photocell input unit 360 for generating an electrical pulse for each 360° rotation of the bobbins 10—10. A three-bladed light chopper 362, located in the housing of the spindle head assembly 53, is driven by the spindle drive shaft 57 at one-third of the speed of the bobbins. The blades of the chopper 362 interrupt a light beam passing between a light source 364 and a resistive photocell 365 to generate electrical pulses. These pulses are fed to an electronic counter unit 370 which comprises a primary counter 371 and a secondary counter 372, each of the latter comprising a series of interconnected glow transfer decade counting tubes. Suitable circuitry is provided for controlling a plurality of counter output relays CR1A, CR1B, CR1C, CR2A, CR2B, CR2C, and CR2D which are energized upon the occurrence of preset counts established by programming preset switches (not shown) associated with the circuitry of the primary counter and the secondary counter.

The counter output relays have associated contacts connected into a stepping switch and control relay unit 380 which, in turn, controls the sequence of operation of the various electrically operated parts, such as clutches, pneumatic valves and the like, of the coil winding machine 50 to achieve the desired automatic control. Feedback control from the coil winding machine 50 to the stepping switch and control relay unit 380 is achieved by means of the conditioning of various microswitches, such as microswitches 159, 162, 195, 202, and 340.

Operation

It will be assumed for the purpose of illustration that it is desired to wind a coil having 6800 turns on each of the bobbins 10—10 and that lead-in and lead-out portions of the coil are to extend from the end of the coil adjacent to the flange 12. Further, it will be assumed that the drive ratio of the rapid traverse drive rod 170 is designed and set such that during the interval in which the rapid traverse carriage 165 moves from its start position until it reaches the predetermined position at which the wire guide tubes 40—40 direct the wire against the flanges 12—12, twenty-five (25) revolutions are made by each of the spindles 55—55, i.e., twenty-five (25) turns of wire will be placed on each of the bobbins 10—10. Accordingly, to insure that at least the last turn of wire is placed against the flange 12 of each of the bobbins, the counter unit 370 is programmed so that the clutch 335, which operates the rapid drive shaft 175, is energized when the primary counter 371 registers the application of the 6770th turn (i.e., 6800 turns minus 30 turns) and, therefore, the last six turns will be against the flange 12.

At the beginning of the cycle, each of the wires extends from its supply (not shown) through a corresponding wire guide tube 40 where the leading end thereof is attached to a corresponding anchor pin 32. This attachment was made by wrapping two turns of the wire during the last previous cycle.

The new cycle begins with the carriage driver 138 at its extreme left-hand position, as shown in FIG. 13, and with the piston rod 148 of the cylinder 150 fully extended so that the horizontal carriage 145 locates the wire guide tubes 40—40 in the anchor pin plane. The vertical carriage 215 at this time is positioned so that each of the wire guide tubes 40—40 is located immediately adjacent to a corresponding anchor pin 32.

As the new cycle commences, the vertical carriage 215 moves downwardly until the wire guide tubes 40—40 are positioned immediately adjacent to the respective arbor pins 31—31 on the arbors 30—30. Immediately thereafter, the wrapping motor 255 is energized to cause the wrapping carriage 240 to revolve, thereby orbiting the wire guide tubes 40—40 about the respective arbor pins 31—31 until two complete turns of wire are placed on each arbor pin. Then the air cylinder 150 is operated to retract the piston rod 148 which, in turn, indexes the horizontal carriage 145 to the right to position the wire guide tubes 40—40 at the flange 12 and substantially in alignment with the respective slots 24—24 on the respective bobbins.

As the horizontal carriage 145 is indexed to the right, a span of the wire from each arbor pin 31 is carried across the top surface of the projecting lug 25 on the corresponding bobbin 10. The vertical carriage 215 then moves downwardly to carry the wire guide tubes 40—40 to horizontal planes substantially below the winding surfaces of the drums of the respective bobbins. Upon subsequent rotation of the arbors, each wire is caused to be cammed into the slot 24 on the respective bobbin, the slot guiding the wire into a position on the winding surface of the drum and against the inside face of the flange 12.

After the last-mentioned horizontal indexing and vertical positioning has taken place, the detent 153 is retracted and the winding of a coil of 6800 turns on each bobbin commences automatically. The primary counter 371 is now activated to register the pulses which will be generated upon rotation of the arbor and which correspond to turns placed on each bobbin. At the start of the winding operation, the main drive motor 300 is energized and the clutch 306 operated so that the spindle shaft initially rotates at a predetermined low speed (e.g., 150 r.p.m.). As each of the arbors 30—30 begins to rotate, the span of wire extending between the corresponding anchor pin 32 and arbor pin 31 breaks.

The low-speed rotation of the arbors 30—30 continues until three closely packed, uniform turns of wire have been placed evenly on the drum 11 of each of the bobbins. As the bobbins are slowly rotated, the distributor shaft 135, which is actuated through the now-energized clutch 324, drives the distributor drive rod 125, the attached carriage driver 138 and horizontal carriage 145, and, thus, the wire guide tubes 40—40, to the right at a speed proportional to the rotational speed of the bobbins. (It will be understood that the winding pitch adjusting unit 315 permits the adjustment and the setting of the speed of the distributor drive shaft 135 relative to the speed of the spindle drive shaft 57 to establish a desired winding pitch.)

As soon as the counter unit 370 registers three turns on the primary counter 371, a first preset count is reached whereat the counter output relay CR1A is energized. Energization of the counter output relay CR1A causes the radial carriage 275 to move outwardly to retract the wire guide tubes 40—40 a short distance preparatory to winding at a much higher speed. The clutch 306 is deenergized and the clutch 307 is now energized. Immediately the high-speed winding commences and the spindles 55—55 are accelerated to a high speed (e.g., 10,000 r.p.m.) and the vertical carriage 215 moves up again to position each of the wire guide tubes 40—40 in a horizontal winding plane coincident with the level of the respective arbor pins 31—31.

Winding continues at this high speed with the distributor drive rod 125 driving the horizontal carriage 145 through the carriage driver 138 to cause the wire guide tubes 40—40 to distribute the wire uniformly across the winding surfaces of the respective bobbins 10—10. The direction of movement of the distributor drive rod is reversed each time the wire reaches the inside face of one of the flanges 11 or 12 of each bobbin 10, by virtue of the reversing switch 195 being actuated by having its actuator 192 struck by the plunger 186 or plunger 199. When the actuator 192 strikes the plunger 199, the switch 195 is thrown to deenergize the clutch 324 and to energize the clutch 325, thereby causing the distributor shaft 135 to reverse and drive the wire guide tubes 40—40 to the left. Subsequently, when the wire guide tubes 40—40 reach a point whereat the wire is directed against the inside face of the flange 12, the reversing switch 195 is tripped to deenergize the clutch 325 and reenergize the clutch 324. In this manner, the wire is distributed uniformly to and fro across the winding surface of the bobbins 10—10 to form superimposed layers of uniformly wound convolutions.

The high-speed winding operation continues with the primary counter 371 registering each of the turns placed on the bobbins 10—10. Finally, at a second preset count (e.g., 6600 turns) on the primary counter 371, the output relay CR1B is energized and, simultaneously, the speed of the main drive motor 300 is reduced so that the bobbins rotate at a lower, intermediate speed (e.g., 2000 r.p.m.) with continuing proportional distribution by the distributor drive rod, until a third preset count (e.g., 6760 turns) is reached on the primary counter 371. At this point, the counter output relay CR1C is energized and locks in. Thereupon, the speed of the main drive motor 300 is further reduced to its lower speed (e.g. 100 r.p.m.). Operation of the relay CR1C also connects the secondary counter 372 to the photo input unit 360 and the secondary counter begins to count simultaneously with the primary counter 371. When a first preset count (e.g., 10 turns) is registered on the secondary counter (6770 turns on the primary counter 371), the counter output relay CR2A is energized. (It will be noted that at this point only 30 turns remain to be wound.) The counter output relay CR2A pulls in and holds, and immediately energizes the rapid traverse clutch 335 which, in turn, puts the rapid traverse carriage 165 in motion from right to left, as viewed in FIG. 13.

Sometime during its leftward travel, the rapid traverse carriage 165 overtakes the carriage driver 138 and the striker 206 on the latter hits the actuator 205 and trips the override microswitch 202. When the override microswitch 202 is operated, it breaks the energizing circuit to the clutches 324 and 325. With the clutches 324 and 325 de-activated, the distributor drive shaft 135 becomes free-wheeling. Thereafter, the carriage driver 138 and the horizontal carriage 145 are carried leftward by the rapid traverse carriage 165 until the wire guide tubes 40—40 have been driven to the respective flanges 12—12 of the bobbins 10—10. At this time, the rapid traverse drive rod 125 trips the limit microswitch 340 and the air cylinder 155 is operated to move the detent 153 into the notch on the locking cam 152. As the detent 153 enters the notch on the locking cam 152, a microswitch 380 (FIG. 16) is operated to deenergize the rapid traverse clutch 335. The rapid traverse drive shaft 175 is now free-wheeling and the springs 179—179 return the rapid traverse carriage 165 to its original start position at the extreme right. The operation of the counter relay CR2A also causes the vertical carriage 215 to index downwardly to position each of the wire guide tubes 40—40 at the level of the corresponding lead-out grooves 23—23.

Subsequently, when a second predetermined count (e.g., 35 turns) is reached on the secondary counter 372, the counter output relay CR2B pulls in and locks. As mentioned previously, the wire guide tubes 40—40 are at this time directing the wires against the inside face of the respective flanges 12—12 on the bobbins. Operation of the counter output relay CR2B deenergizes the high-speed clutch 307 and energizes the low-speed clutch 306 in the speed change unit 305 and the spindles now rotate at a very low speed (e.g., 100 r.p.m.).

Subsequently, when a third predetermined count (e.g., 37 turns) is reached on the secondary counter 372, the counter output relay CR2C pulls in to initiate the taping operation. The taping units 45—45 move in and an overlapping length of tape 46 is wrapped about each of the slowly rotating bobbins 10—10 simultaneously with the application of the last three turns of wire.

Finally, when the fourth preset count (e.g., 40 turns) is reached on the secondary counter 372 (6800 turns on the primary counter), the counter output relay CR2D is energized. Energization of the relay CR2D deenergizes the clutch 307 and a spindle detent (not shown) is actuated to stop the spindles with the bobbins 10—10 positioned as shown in FIG. 9. Immediately thereafter the radial carriage 275 moves the wire guide tubes 40—40 in a short distance and then the air cylinder 150 is actuated to extend the piston rod 148. As a result, the horizontal carriage 145 is indexed to the left to position the wire guide tubes 40—40 in the anchor pin plane. This movement of the wire guide tubes 40—40 carries a span of wire through the lead-out groove 23 of each of the bobbins 10—10 and under the corresponding arbor guide pin 47.

The vertical carriage 215 then moves upwardly to position each of the wire guide tubes 40—40 immediately adjacent to the corresponding anchor pin 32. The wrapping carriage 240 is next operated to wrap the wires about the respective anchor pins 32—32 and the cutters 48—48 are subsequently operated to sever the portion of the span of each wire extending between the anchor pin 32 and the arbor guide pin 47. The cycle is now complete and a coil of wire having 6800 turns has been formed on each bobbin and provided with lead-in and lead-out portions of predetermined lengths.

It will be understood that, although in the present embodiment, it was desirable to place the last turn of a predetermined number of turns immediately adjacent to one of the flanges of a bobbin, it is conceivable that in some other operation it may be desirable to place the last turn at some other position on a bobbin. Manifestly, by utilizing the principles of the present invention, the positioning of the last turn can be selected and controlled as desired. It should be obvious that numerous modifications may be made within the spirit and scope of the invention.

What is claimed is:

1. Apparatus for winding a desired number of turns of a strand material onto a winding form, which comprises:

a strand guide for directing strand material;

means for causing relative rotation between a winding form and the strand guide to wind the strand material in a plurality of turns onto a winding surface of the form;

a movable distributor carriage for mounting the strand guide;

drive means normally connected to the distributor carriage for driving the same reciprocatively so as to cause the strand guide to distribute the strand material back and forth across the winding surface of the form in a plurality of layers of convolutions;

traverse means normally positioned at a rest position adjacent to one end of the path of travel of the reciprocating distributor carriage, said traverse means being normally inoperative and disconnected from the distributor carriage;

means for counting the turns of strand material wound on the winding form;

means actuated by the counter, when a predetermined number of the desired number of turns remain to be wound on the winding form, for operating the traverse means to move the traverse means from said rest position and along said path of travel of the reciprocating distributor carriage toward the other end of said path so that said traverse means overtakes the distributor carriage somewhere on said path of travel;

override means actuated, when the moving traverse means overtakes the distributor carriage, for disconnecting the distributor drive means and for causing further movement of the distributor carriage and the guide to be controlled by the traverse means, the rate of movement of the traverse means bearing a relation to the relative rotational speed of the winding form such that, when the counting means registers the desired number of turns, the distributor carriage has moved to a position on said path of travel wherein the strand guide directs the last turn of said desired number onto a preselected portion of the winding form.

2. Apparatus for winding a desired number of turns of strand material onto a flanged bobbin and for insuring that the last turn is placed on the bobbin immediately adjacent to one of the flanges of the bobbin, which comprises:

a strand guide for directing strand material from a supply thereof;

means for rotating the bobbin relative to the strand guide to wind the strand material onto a winding surface of the bobbin;

a movable distributor carriage for mounting the strand guide for movement in a direction substantially parallel to the rotational axis of the bobbin;

drive means normally connected to the distributor carriage for reciprocating the same at a rate proportional to the rotational speed of the bobbin to cause the strand guide to distribute the strand material to and fro uniformly across the winding surface of the bobbin in a plurality of layers of convolutions;

traverse means normally positioned at a rest position adjacent to the end of the path of travel of the distributor carriage furthest removed from said one bobbin flange, said traverse means being normally inoperative and disconnected from the distributor carriage;

a counter for registering the number of turns wound on the bobbin;

means actuated by the counter, when a predetermined number of the desired number of turns remain to be wound on the bobbin, for driving the traverse means to move the traverse means from said rest position at a predetermined speed along said path of travel of the reciprocating distributor carriage so that the traverse means overtakes the distributor carriage somewhere on said path of travel; and override means, actuated when the moving traverse means overtakes the distributor carriage, for disconnecting the distributor drive means and for causing further movement of the distributor carriage and the guide to be controlled by the moving traverse means, the speed of the traverse means along said path of travel bearing a fixed relation to the rotational speed of the bobbin such that when the counter subsequently registers the desired number of turns, the distributor carriage has been moved to the opposite end of said path of travel in which position the strand guide is directing the strand to a point on the winding surface of the bobbin immediately adjacent to said one flange.

3. Apparatus according to claim 2 wherein the traverse means includes a movable carriage.

4. Apparatus according to claim 2 including means operated by the counter for stopping the rotation of the bobbin rotating means, when the counter means registers the desired number of turns, and for returning the traverse means to said rest position.

5. Apparatus according to claim 4 wherein said means operated by the counter disconnects the traverse driving means from the traverse means and spring means are provided for returning the traverse means to said rest position.

6. Apparatus for winding strand material on a winding form, which comprises:

a strand guide for directing strand material;

means for causing relative rotation between a winding form and the strand guide to wind the strand material onto a winding surface of the form;

a movable distributor carriage for mounting the strand guide;

drive means normally connected to the distributor carriage for driving the same reciprocatively so as to cause the strand guide to distribute the strand material back and forth across the winding surface of the form in a plurality of layers of convolutions;

traverse means normally positioned at a rest position adjacent to one end of the path of travel of the reciprocating distributor carriage, said traverse means being normally inoperative and disconnected from the distributor carriage;

means responsive to a predetermined number of convolutions being distributed on the winding form for operating the traverse means to move the traverse means from said rest position and along said path of travel of the reciprocating distributor carriage toward the other end of said path so that said traverse means overtakes the distributor carriage somewhere on said path of travel; and means actcuated when the traverse means overtakes the distributor carriage for disconnecting said drive means and for causing further movement of the strand guide to be controlled by the traverse means, the rate of movement of the traverse means bearing a relation to the relative rotational speed of the winding form to displace the strand guide to a predetermined position after an additional predetermined number of convolutions are distributed on the winding surface.

7. Apparatus according to claim 6 including means for stopping further movement of the traverse means when the additional predetermined number of convolutions have been distributed on the winding form.

References Cited by the Examiner
UNITED STATES PATENTS

| 2,971,710 | 2/1961 | Bunch | 242—25 |
|---|---|---|---|
| 2,971,711 | 2/1961 | Hauer | 242—25 |
| 3,022,020 | 2/1962 | Higgins | 242—18 |
| 3,061,236 | 10/1962 | Lang | 242—158.4 |
| 3,231,207 | 1/1966 | Loscudo et al. | 242—18 |

FRANK J. COHEN, *Primary Examiner.*

W. S. BURDEN, *Assistant Examiner.*